United States Patent Office 3,218,596
Patented Nov. 16, 1965

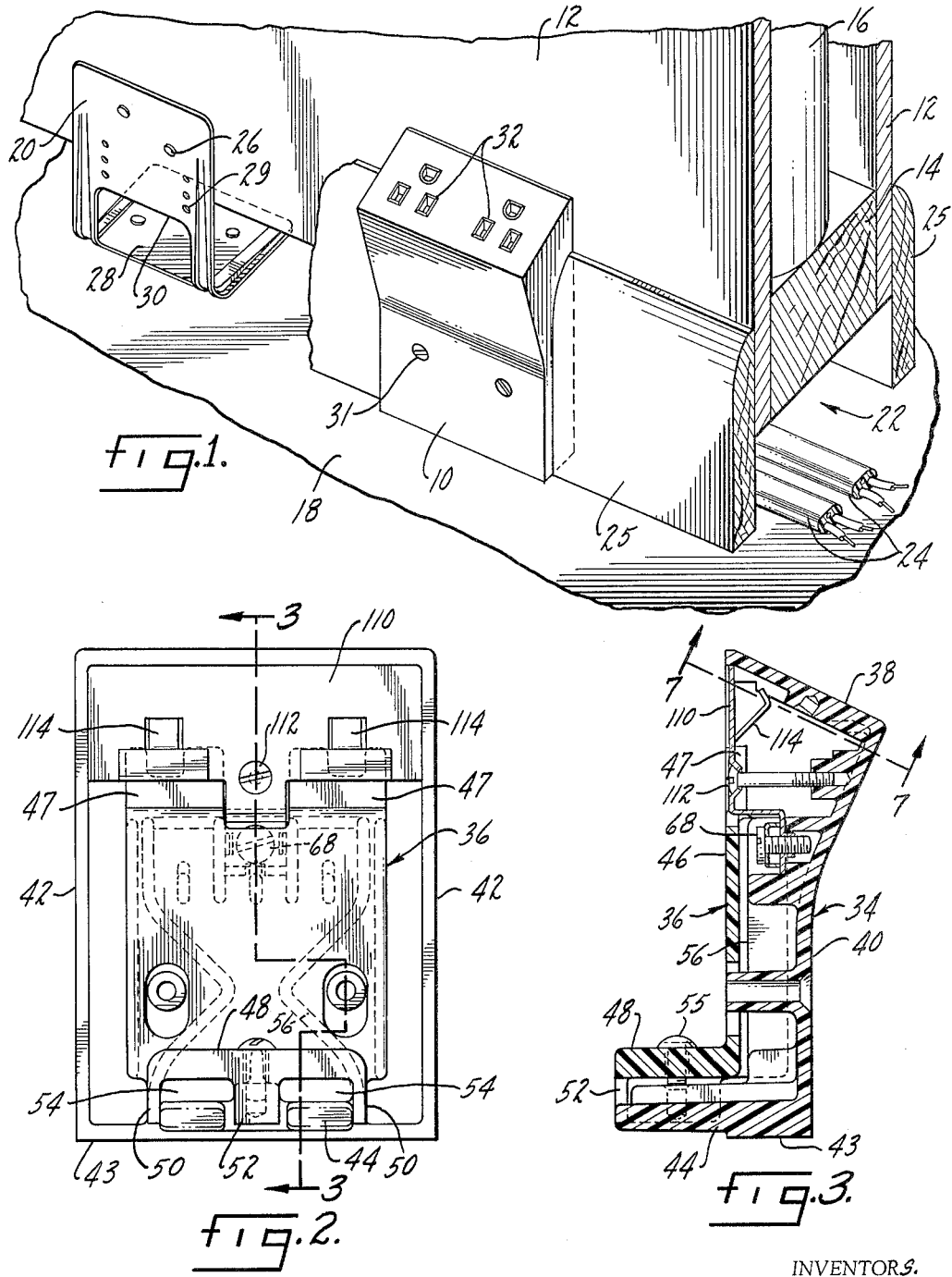

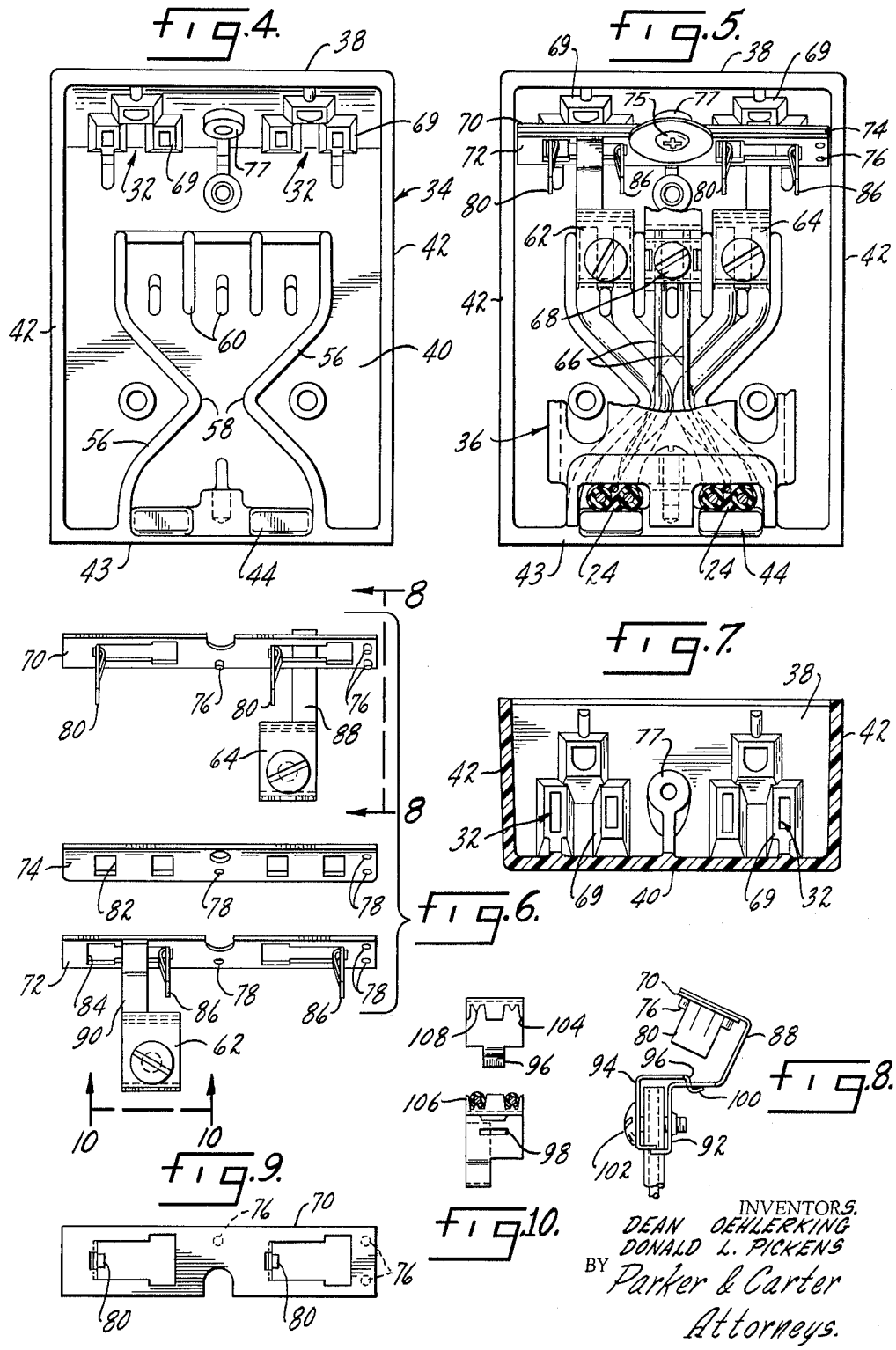

3,218,596
WIRING DEVICE MOUNTED ON THE BOX COVER AND OUTLET BOX
Dean Oehlerking, Sycamore, and Donald L. Pickens, De Kalb, Ill., assignors to Ideal Industries, Inc., Sycamore, Ill., a corporation of Illinois
Filed Feb. 4, 1963, Ser. No. 255,751
10 Claims. (Cl. 339—14)

This invention relates to a wiring device and outlet box.

A primary purpose of the invention is a box of the type described which is adapted to be positioned on the outside of a wall having a cable trough running along the floor.

Another purpose is a wiring device and outlet box, the height of which is adjustable after installation on a wall.

Another purpose is a box of the type described, formed of a plastic or the like, which is attractive in appearance and may be installed without cutting holes in a wall.

Another purpose is a wiring device and outlet box which may be completely installed during the roughing-in period.

Another purpose is an outlet box of the type described which may be installed with a minimum of time and effort.

Another purpose is a wiring device and outlet box having an improved structure for making electrical contact with an inserted plug.

Another purpose is a combination wiring device and outlet box having an adjustable strain relief.

Another purpose is a box of the type described including yielding releasable terminals for attaching the cable wires to the box.

Another purpose is a box of the type described in which the wires do not have to be stripped for installation.

Other purposes will appear in the ensuing specification, drawings and claims.

The invention is illustrated diagrammatically in the following drawings wherein:

FIGURE 1 is a perspective view illustrating the wiring device and outlet box as mounted on a wall.

FIGURE 2 is a back view of an assembled box,

FIGURE 3 is a section along plane 3—3 of FIGURE 2,

FIGURE 4 is a back view of the cover, with parts removed for clarity,

FIGURE 5 is a back view of the cover showing a portion of the back plate and wires in position, FIGURE 6 is an exploded view illustrating the electrical contact structure, FIGURE 7 is a section along plane 7—7 of FIGURE 3, FIGURE 8 is a view along plane 8—8 of FIGURE 6, FIGURE 9 is a plan view of one of the elements forming the electrical contact structure, and FIGURE 10 is a view along plane 10—10 of FIGURE 6.

Considering FIGURE 1, a wiring device and outlet box 10 may be used with an interior wall structure formed by a pair of spaced wallboard sections 12, which may be gypsum board or the like, commonly known as "dry wall," positioned apart by a lower wood frame member 14 and a plurality of tubes or the like 16, which may be formed of a heavy paper. The wall may be formed in panels and is raised off the floor 18 by means of brackets or the like 20. Beneath the wood frame member 14 is a cable trough 22, with the trough being defined by the raised wall and the wood trim. Within the cable trough are a pair of cables 24 which may be Romex, or any other suitable type of conduit containing two wires and a ground. The box is designed for use with non-metallic sheathed cables, although metallic sheathed cables may also be used.

Each bracket 20, which may be nailed to the wall, as at 26, includes an inwardly extending lower plate 28 which extends underneath the wall and may be nailed to the floor. There is an enlarged opening 30 in the front of the bracket 20 which provides access to the cable trough. Molding strips 25 or the like may be positioned on each side of the box 10 after installation.

The bracket 20 has a plurality of mounting holes 29 which are used in fastening the box 10 to the wall. Screws or the like 31 pass through the box into the holes 29, with the height of the box above the floor being adjustable, even after installation.

The wall structure shown forms no part of this invention. However, the outlet box shown is designed for use with such a wall. In forming the walls, each of the wall panels is raised and held in a raised position by the brackets 20. There is thus a cable trough running around all or a part of the room at the bottom of the wall or adjacent the floor. Any number of boxes may be fed from the cable trough and boxes may be fastened to both sides of the wall.

The outlet box 10 may have a pair of plug receiving openings indicated at 32. As shown in FIGURE 1, there are three openings in each group, two for the normal electrical service and one for ground. The invention should not be limited to this particular configuration, although in present electrical practice there is provision for a ground connection.

Considering FIGURES 2 and 3, the outlet box 10 includes a front cover 34 and a back plate 36. Both the cover and the back plate may be formed of plastic or any other suitable material, and if they are formed of plastic they may be molded. The cover 34 may have an upper slanted wall 38 in which the openings 32 are formed and a front wall 40 which bends outwardly near the top where it meets the slanted wall 38. The cover 34 may also have rearwardly extending side walls 42 and bottom wall 43 and a rearwardly extending bottom platform 44.

The back or rear plate 36 may have a generally vertical wall 46, the upper end of which has spaced lugs 47, and a rearwardly extending cap or cover 48 which overlies the platform 44, and as shown in FIGURE 2, has sidewalls 50 and a center divider 52. The sidewalls 50 and the center divider 52 define a pair of cable receiving openings 54. The Romex or other cable being used may be positioned in these openings and then the back plate may be screwed down onto the platform 44 by means of a screw or the like 55 to firmly clamp the cable to the box. The combination of the rearwardly extending platform and the cap forms a strain relief for firmly holding the cable to the box. The height of the cap relative to the platform may be varied to provide for different size cables.

As illustrated in FIGURES 4 and 5, the cover may include a pair of rearwardly extending spaced walls 56 which converge in the middle, as at 58, and then diverge downwardly toward the cable entrances and upwardly toward the wire terminals. There may be a group of small walls or partitions 60 near the upper end of the walls 56 forming dividers between each wire. The wall arrangement 56 directs the wires from the cables toward the proper terminals and allows the wires to lay neatly against the cover. One wire from each of the cables 24 will go to the left-hand terminal 62 and one wire from each of the cables 24 will go to the right-hand terminal 64. The wires criss-cross within the space defined by the walls 56. Both of the ground wires 66 go to the center ground terminal 68.

As shown in FIGURES 4 and 7, the inside surface of the slanted wall 38 has a group of bosses 69 surrounding the plug receiving openings 32. There are three bosses in each group, and again this may vary depending upon whether the box is formed with a ground connection.

FIGURE 6 illustrates the structure for making electrical contact with an inserted plug and for connecting to the cable wires. A front plate 70 formed of a suitably electrically conductive material, for example copper or the like, is spaced from a rear plate 72, formed of the same material, by an insulating plate 74, which may be plastic or some other suitable material. Small insulating pegs or the like 76 on plate 70 may pass through aligned holes 78 to fasten the plates 70, 72 and 74 together. In the alternative, the plates may be adhesively secured together. The structure made up of plates 70, 72 and 74 may be attached to cover 38 by means of a screw 75 which threads into boss 77 on the cover. Plate 70 has contacts 80, formed integrally with the plate, the contacts extending rearwardly through openings 82 in the insulating plate 74 and through openings 84 in the rear plate 72. The contacts 80 will not touch the rear plate 72. Rear plate 72 has integral contacts 86, which also extend rearwardly. Contacts 80 and 86 are positioned in alignment with holes 32 and will firmly bear against the contacts of an inserted plug.

Attached to the front plate 70 is a strap 88 carrying terminal 64 at its outer end. A second strap 90, attached to plate 72, carries terminal 62 at its outer end. The terminals 62 and 64 are shown in detail in FIGURES 8 and 10. Each terminal includes a lower member 92, integral with its mounting strap and an upper member 94. Member 94 has a tab 96 which passes through an opening 98 in member 92. The tab has a bent-over portion 100 which is pressed against a portion of member 92, when the terminal is in the closed position of FIGURE 8, thereby yieldingly urging the terminal to an open position. As the screw 102 holding the members 94 and 92 together is turned back, the terminal will open.

The members 92 and 94 may each have edges 104 and 106, which are opposed and which are serrated or otherwise formed to have sharp projections or prongs 108. It is not necessary to strip the insulation off the end of the wires, as the prongs 108 will pierce the insulation and make contact with the wire when the contacts are in the closed position of FIGURE 8.

FIGURE 3 illustrates the details of the ground connection. A ground plate 110, in contact with ground terminal 68, may be fastened to the cover by means of a screw or the like 112 and is adapted to overlie the electrical contact structure illustrated in FIGURE 6. Fastened to the ground plate are straps or contacts 114 which extend up toward the ground plate openings in upper wall 38. When a plug is inserted in one group of openings 32, the ground contact on the plug will be in contact with the contact or strap 114.

The use, operation and function of the invention are as follows:

One of the new types of interior wall panels being provided by building materials manufacturers is designed to be butted up against the ceiling of a room and to have a cable trough at its bottom. The combination wiring device and outlet box shown herein is designed for use with a cable trough adjacent the floor. The box, which has a cable entrance extending into the trough, may be attached to one of the brackets used to hold the wall structure up off the floor. The height of the box relative to the floor is adjustable, after installation, so that if carpet is later laid in a room, the box may be merely raised and there is no problem with forming additional holes in the wall.

The box may be attached to the wall without forming any holes. This is particularly advantageous. Additionally, the electrician may complete all his wiring during the roughing-in period.

To wire in a box of this type, the cover is first laid down on its face at the point of installation and the cables are brought through the bracket. The wires are freed from the cables and they are then placed in the terminals. It is not necessary to strip the insulation off the wires as the terminals will pierce the insulation and make contact with the wires therein. The terminals are yieldingly held in an open position, which further eases the installation. The wires will be positioned in the terminals, and because of the bend in the wires, they will tend to stay in place. After the terminals have been closed down on the wires, the upper lugs on the rear plate are slipped under the ground plate and the strain relief is tightened down on the cables. The strain relief forms a part of the cable entrance. The entire box may then be mounted on one of the brackets with the strain relief or cable entrance extending through the opening in the bracket. The box is fastened to the wall by screwing it to the bracket and it is not necessary to form holes in the wall.

Of importance is the sandwich construction forming the electrical part of the box. A pair of spaced electrically conductive plates are insulated from each other by a plastic strip or plate. Integral with each of the plates is a strap with each strap mounting the wire terminals. The rear plate has openings so that the contacts from the front plate may pass through it without touching. A ground plate overlies the entire electrical contact structure and has inwardly bent straps or contacts which are adapted to make contact with the ground of an inserted electrical plug.

The cover and back plate, both of which may be formed of plastic, together form an enclosure. It is no longer necessary to use the conventional metal box which must fit in a hole in the wall and then be covered by a face plate after the socket has been inserted. There are only two parts to the box, with the electrical structure being fixed to one of the parts. The box is pleasing in appearance and may be attached to the outside of the wall. Molding strips or the like, as shown in FIGURE 1, may be positioned on each side of the box after installation.

The converging walls 56 are advantageous in that the wires from the cables may all be cut to the same length and each wire will reach the terminal. The converging walls form paths of equal length to the terminals.

Whereas the preferred form of the invention has been shown and described herein, it should be realized that there are many modifications, substitutions and alterations thereto within the scope of the following claims.

We claim:

1. An electrical outlet box including a cover having rearwardly extending walls and a rear plate attached thereto, said cover having at least one group of openings for insertion of an electrical plug, means mounted on the cover for attaching the wires of an electrical cable to the box, an opening in the box to receive the cable, and means for receiving an electrical plug and for electrically connecting it to the cable wires including a pair of plates with a layer of insulation therebetween, said plates being attached to the cover with each plate having rearwardly extending integral contacts, the rear plate of said pair of plates having openings through which the front plate contacts pass.

2. The structure of claim 1 further characterized by a ground plate attached to the cover, and means attached to the ground plate for making contact with an inserted electrical plug.

3. The structure of claim 1 further characterized in that the opening in the box to receive the cable is defined by said cover and rear plate, said cover and rear plate further defining a strain relief for the cable.

4. The structure of claim 3 further characterized in that said rear plate is adjustably mounted to the front plate to compensate for various size cables.

5. The structure of claim 3 further characterized in that said cover includes a lower rearwardly extending platform, said rear plate including a rearwardly extending cap, which together with said platform, defines a cable entrance.

6. The structure of claim 5 further characterized in that said rearwardly extending cap overlies said platform and is spaced therefrom, said spacing being adjustable to provide for different sized cables.

7. The structure of claim 6 further characterized in that the cable is clamped between said platform and said rearwardly extending cap to provide a strain relief for the cable.

8. The structure of claim 1 further characterized in that the means for attaching the wires of a cable to the box include a pair of releasable terminals each of which includes spaced members having opposed serrated edges adapted to pierce the insulation on the wires.

9. The structure of claim 8 further characterized in that each pair of terminals is yieldingly urged to an open position.

10. The structure of claim 9 further characterized in that each of said pair of terminals is yieldingly urged to an open position by a tab, connected to one member, and passing through a portion of the other member, said tab being pressed against said other member when the terminal is closed.

References Cited by the Examiner
UNITED STATES PATENTS

| | | | |
|---|---|---|---|
| 1,801,550 | 4/1931 | Fullman. | |
| 1,857,378 | 5/1932 | Hubbell | 174—49 X |
| 1,914,317 | 6/1933 | Wilson | 174—53 |
| 1,956,018 | 4/1934 | Gilbert | 339—99 |
| 1,981,239 | 11/1934 | Manske | 174—48 |
| 1,995,855 | 3/1935 | Lee et al. | 174—48 |
| 2,039,982 | 5/1936 | Schaller | 174—48 |
| 2,066,876 | 1/1937 | Carpenter et al. | 174—68.5 X |
| 2,124,943 | 7/1938 | Bennett | 339—107 |
| 2,215,712 | 9/1940 | Peck | 339—155 |
| 2,771,501 | 11/1956 | Despard | 174—53 |
| 2,810,894 | 10/1957 | Kerr | 339—99 |
| 2,869,040 | 1/1959 | Piper | 339—17 |
| 3,064,224 | 11/1962 | Wiley | 339—14 |
| 3,118,714 | 1/1964 | Ludwig | 339—14 |

JOHN F. BURNS, *Primary Examiner.*

JOHN P. WILDMAN, E. JAMES SAX, *Examiners.*